Aug. 24, 1954     A. M. FONTAL     2,687,030
LOCKING UNIT FOR STEERING WHEELS
Filed Nov. 10, 1950     2 Sheets-Sheet 1

INVENTOR.
ALFONSO MARTINEZ FONTAL
BY
Raymond N. Matson
AGENT

Aug. 24, 1954
A. M. FONTAL
2,687,030
LOCKING UNIT FOR STEERING WHEELS
Filed Nov. 10, 1950
2 Sheets-Sheet 2
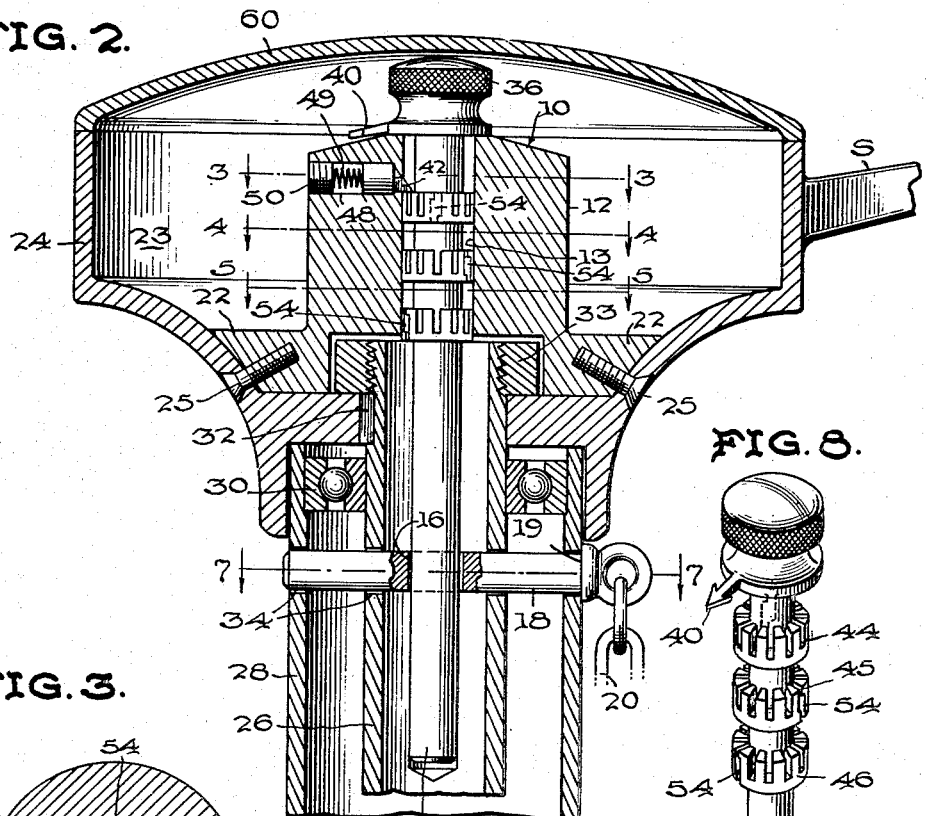
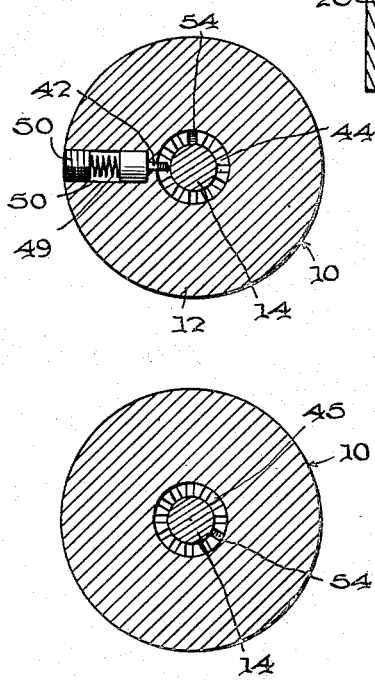
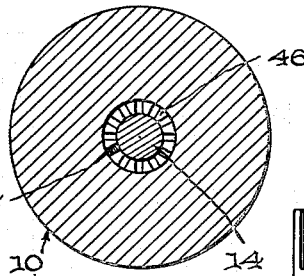
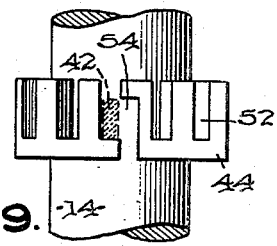
INVENTOR.
ALFONSO MARTINEZ FONTAL
BY
*Raymond N. Matson*
AGENT Patented Aug. 24, 1954

2,687,030

UNITED STATES PATENT OFFICE 2,687,030

LOCKING UNIT FOR STEERING WHEELS

Alfonso Martinez Fontal, Bogota, Colombia

Application November 10, 1950, Serial No. 195,005

13 Claims. (Cl. 70—184)

This invention relates generally to locking devices and more particularly to a combination type locking unit which may be readily installed and concealed in conventional automobile steering wheels.

Various means for locking steering wheels are known in the art and as a whole they are characterized by a number of inherent disadvantages. Among these objectionable characteristics are a complexity of design and resulting excessive first and maintenance costs, an excessive bulkiness making it unattractive as an accessory not only in appearance but in its space requirements, conspicuousness so as to invite undesirable attention, and poor arrangement and location with respect to the steering wheel so as to make it difficult and impractical in use.

Accordingly, the chief object of the present invention is to obviate the foregoing and other disadvantages characterizing known structures.

Another important object of the present invention is to provide a locking unit which may readily be combined with and installed without major change on conventional automobile and other type steering wheels.

A further important object of the present invention is to provide a locking unit for steering wheels which may be concealed within the hub of the wheel so as to give no indication of its presence.

A still further important object of the present invention is to provide a locking unit for steering wheels which controls the axial movement of a bolt which may project through a locking key to prevent relative movement between the steering shaft and its housing.

Another important object of the present invention is to provide a locking unit of the combination type which is simple but rugged in construction, easy to operate and which will give a high degree of protection from lock pickers.

Other objects and advantages of the invention will become apparent during the course of the following description.

In the drawings, I have shown one embodiment of the invention. In this showing:

Figure 2 is a central vertical sectional view thereof;

Figure 3 is a horizontal sectional view of the locking unit taken on the line 3—3 of Figure 2;

Figure 4 is a horizontal sectional view of the locking unit taken on the line 4—4 of Figure 2;

Figure 5 is a horizontal sectional view of the locking unit taken on the line 5—5 of Figure 2;

Figure 8 is a perspective view of the axially movable locking bolt; and

Figure 9 is a side elevation view of one of the combination flanges on the locking bolt.

Figure 1:
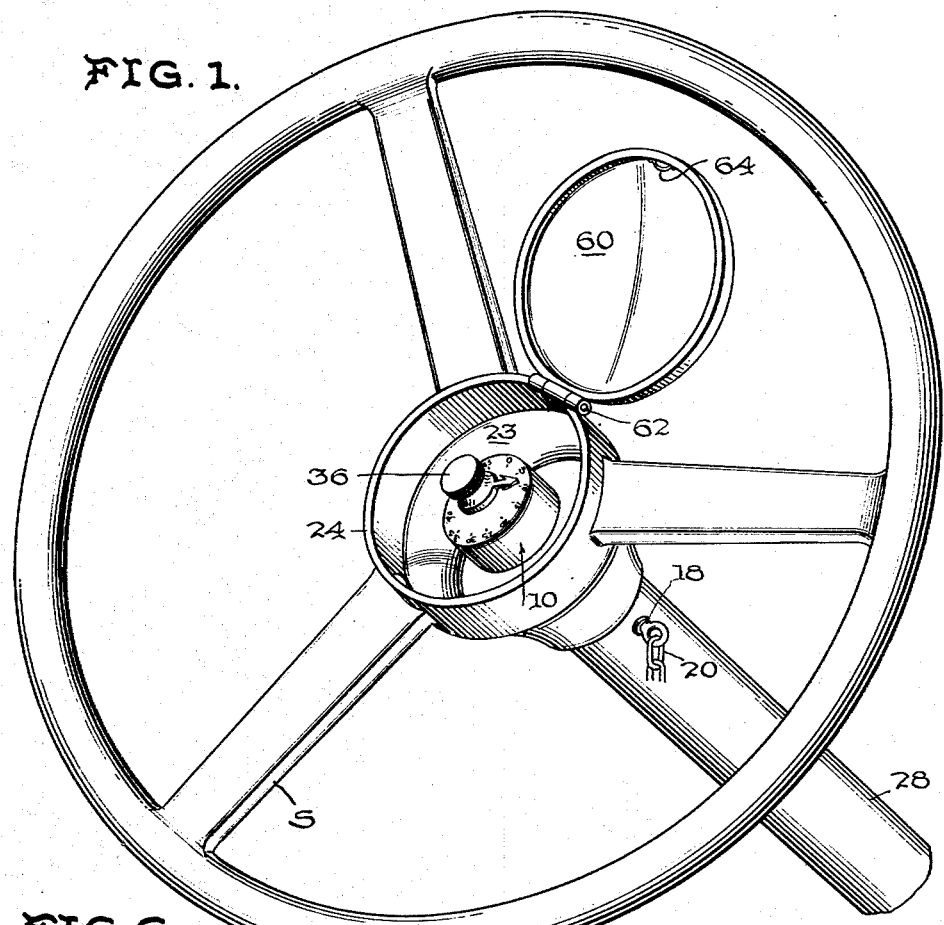
Figure 1 is a perspective view of the locking unit in operative position within the hub of a steering wheel.
Figure 6:
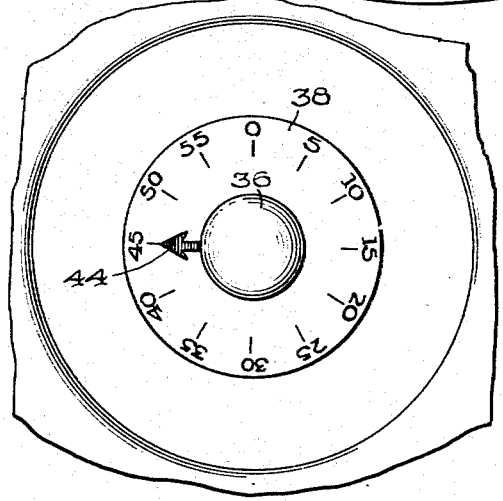
Figure 6 is a top plan view of the locking unit showing the combination dial.
Figure 7:
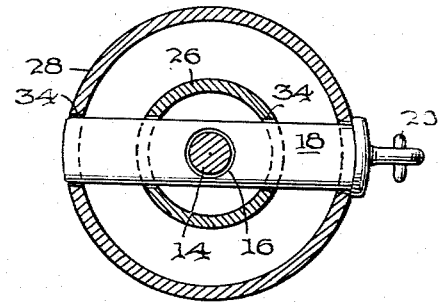
Figure 7 is a horizontal sectional view of the locking key in operative position taken on the line 7—7 of Figure 2.

Referring now to the drawings, numeral 10 designates the locking unit as a whole which comprises an annular lock base 12 having a locking bolt 14 projecting axially through its bore 13. The bolt 14 is adapted to project through an aperture 16 in a locking key 18 which is connected by means of a chain 20 to the vehicle dash or steering column for reasons to be disclosed. The key 18 is provided with a shoulder 19 to act as a stop when the bolt 14 and the aperture 16 are in proper alignment.

As seen in Figure 2, the base 12 includes an annular flange 22 by which it is secured to the inner side of the circular recess 23 formed in the hub 24 of a conventional steering wheel as by screws 25. As is current practice, a steering shaft tube 26 is mounted within and spaced from the steering housing 28 by a bearing 30 and extends into the hub recess 23. The hub of the steering wheel S is keyed to the tube 26 as at 32 and secured thereon by means of a nut 33.

In accordance with the present invention, the steering tube 26 and the housing 28 are each provided with a pair of diametrically opposed apertures 34 for the reception of the locking key 18 when the four apertures are in alignment. Preferably, the apertures are located just below the skirt of the hub 24 and conform to the cross-sectional shape of the key which is rectangular with rounded edges.

The upper end of the locking bolt 14 is provided with an enlarged head or knurled operating knob 36 the shoulder of which supports the bolt in operative position on the upper face of the base 12 upon which a graduated dial 38 is formed and a pointer 40 is fixed to the bolt. Withdrawal of the bolt from the bore 13 is prevented by the engagement of a detent 42 with the uppermost of a plurality of spaced annular combination flanges 44, 45 and 46 fixed to the bolt.

The detent 42 is slidably mounted in a radial bore 48 communicating with the bore 13 and is resiliently urged against the bolt 14 by a spring 49 acting against a threaded bore closure plug

50. The face of the detent is inclined downwardly so that the bolt and its flanges 44, 45 and 46 may be readily pushed past it downwardly through the bore 13 into locking position but may not be retracted without manipulation of the combination.

Each of the bolt flanges has a plurality of vertical slots 52 formed therein but only one of these slots in each of the flanges 44, 45 and 46 is a combination slot and permits the passage of the detent 42, the rest being dummies. As seen in Figure 9, the combination slot 54 is a double width slot closed at the bottom at its left side and at the top on its right side for reasons which will become apparent. As seen in Figures 3-5 inclusive, the combination notches are angularly displaced 120° with respect to each other for purposes of illustration only. Likewise, the pointer 40 is angularly displaced 90° counterclockwise with respect to the combination slot in the flange 44. However, the angular position of the pointer 40 and each of the combination flanges is intended to be varied with respect to each other to provide the many different combinations necessary in a lock.

The lock 10 is concealed within the hub 24 by means of the conventional car name plate disk 60 which is hinged thereto as at 62. A suitable snap catch device 64 maintains the cover disk in closed position and conceals the lock 10. The recess 23 under the cover 60 varies in diameter and depth in some steering wheels but such variations may obviously be accommodated by varying the same dimensions of the lock 10.

Inasmuch as the statutes of certain States require that the steering wheel be unlocked before the ignition circuit is closed, the locking key 18 performs a dual function. A small socket (not shown) is included in the ignition circuit and attached to the dash, etc. of the vehicle. By such device, the circuit is open until the key 18 is withdrawn from the steering housing shaft 28 and inserted in the socket. The key will close the part of the ignition circuit opened by the socket to then permit its normal functioning. The handle of the key is of course insulated and loss of the key is prevented by use of the chain 20.

As shown in Figure 2, the steering wheel S is locked and the lock 10 is concealed. To unlock the wheel, the name plate cover 60 is opened and the pointer 40 manipulated about the dial 38 by means of the control knob 36. In the example shown, the combination is 30—10—50. Upon rotation of the pointer to numeral 30, the combination slot on the bolt flange 44 is in alignment with the detent 42.

The knob 36 is now lifted until the detent strikes the bottom edge of the combination slot 54 (Figure 9) whereupon the knob is rotated from left to right and lifted further so that the combination flange 44 is now above the detent. This operation is repeated for the flanges 45 and 46 and when the latter has cleared the detent 42, the lower end of the locking bolt will be withdrawn from the aperture 16 of the locking key 18. The key is now withdrawn to unlock the steering wheel and placed in the ignition socket whereupon normal functioning of the ignition circuit may then be had. The locking bolt 14 may now be entirely withdrawn or returned to the position shown in Figure 2 as in the locking procedure.

To lock the steering wheel S, the key 18 is withdrawn from the ignition socket and inserted in the aperture 34 which may be aligned by rotation of the wheel S. The locking bolt 14 is merely pushed downward through the bore of the base 12, each combination flange in turn striking the inclined face of the detent 42 to push it back into its bore 48. The spring 49 returns the detent 42 to locking position as shown in Figure 2.

It will be readily apparent that the lock 10 is thus very easy to operate but difficult for unauthorized persons not having the combination. Efforts to work the combination by trying the detent in each of the slots will provide no clue as both the dummy and the combination slots are closed at their bottoms. Only rotation of the rod 14 in the proper direction when the detent is in a combination slot will enable lifting of the flange past the detent. Obviously, the number of slots and the required direction of rotation when the detent is in a combination slot can be varied on one or each of the combination flanges as well as the number or spacing of the flanges themselves.

It will thus be seen that the locking unit comprising the present invention may readily be installed on conventional steering wheels with only minor modification well within the province of a mechanic and comprises a highly efficient as well as useful accessory therefor. The fact that it is concealed from the public and acts entirely within the conventional steering wheels and their shafts makes it doubly valuable for the purpose in question.

It will be understood that the expression withdrawal or retraction of the bolt is intended to mean the removal or partial removal of the bolt from the bore of the base 12.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, and combination lock means mounted in said recess and axially movable in said housing to engage said key to prevent its retraction from said apertures.

2. In a steering wheel locking device, the combination of a housing, a steering shaft rotatably mounted in said housing, a steering wheel fixed to said shaft and having a recess in its hub, aligned apertures formed in said housing and said shaft, an apertured key projecting through said apertures and preventing relative rotation between said shaft and said housing, and a combination lock including a bolt mounted in said recess and axially movable within said housing to project through said apertured key to prevent its retraction from said aligned apertures.

3. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, and combination lock means mounted in said recess and engaging said key to prevent its retraction from said apertures, said means comprising a base including a bore, a headed bolt mounted therein for axial movement in said housing, an annular flange fixed to said bolt, a detent mounted in said base and projecting into said first bore to prevent retraction of said bolt by engaging said flange, and a slot formed in said flange to permit its retraction past said detent.

4. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, and combination lock means mounted in said recess and engaging said key to prevent its retraction from said apertures, said means comprising a base including a bore, a headed bolt mounted therein for axial movement in said housing, an annular flange fixed to said bolt, a detent mounted in said base and projecting into said first bore to prevent retraction of said bolt by engaging said flange, and a slot formed in said flange to permit its retraction past said detent, said slot being constructed and arranged to prevent straight line passage of said detent therethrough.

5. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, and combination lock means mounted in said recess and engaging said key to prevent its retraction from said apertures, said means comprising a base including a bore, a headed bolt mounted therein for axial movement in said housing, an annular flange fixed to said bolt, a detent mounted in said base and projecting into said bore to prevent retraction of said bolt by engaging said flange, and a slot formed in said flange to permit its retraction past said detent, said slot comprising two parallel portions and a connecting portion.

6. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, combination lock means mounted in said recess and axially movable in said housing to engage said key to prevent its retraction from said apertures, and a cover plate hinged to said hub to conceal said means in said recess.

7. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, an annular flange fixed to said bolt, a detent mounted in said base and engaging said flange to prevent withdrawal of said bolt, and a slot formed in said flange to permit passage of said flange past said detent when the combination is set to align them.

8. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, an annular flange fixed to said bolt, a detent mounted in said base and engaging said flange to prevent withdrawal of said bolt, and a slot formed in said flange to permit passage of said flange past said detent when the combination is set to align them, said slot being constructed and arranged to prevent straight line passage of said detent therethrough.

9. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, an annular flange fixed to said bolt, a detent mounted in said base and engaging said flange to prevent withdrawal of said bolt, and a slot formed in said flange to permit passage of said flange past said detent when the combination is set to align them, said slot comprising two parallel portions and a connecting portion.

10. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, an annular flange fixed to said bolt, a detent mounted in said base and engaging said flange to prevent withdrawal of said bolt, a slot formed in said flange to permit passage of said flange past said detent when the combination is set to align them, and a plurality of other slots formed in said flange to prevent passage of said detent and detection of the combination.

11. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, a plurality of spaced annular flanges fixed to said bolt, a detent mounted in said base and acting to prevent withdrawal movement of said flanges therepast, and slots formed in each of said flanges to permit their passage by said detent when the combination is consecutively set to align each of said slots with said detent.

12. A combination lock unit for steering wheels having a recess in the hub comprising an annular base mountable in the recess, a headed locking bolt projecting axially therethrough and bearing against a surface thereof, said bolt having locking engagement with a wheel-locking key when in locking position, a plurality of spaced annular flanges fixed to said bolt, a detent mounted in said base and acting to prevent withdrawal movement of said flanges therepast, and slots formed in each of said flanges to permit their passage by said detent when the combination is consecutively set to align each of said slots with said detent, the slot in one of said flanges being angularly displaced with respect to the slot in one or more of said other annular flanges.

13. In a steering wheel locking device, the combination of a housing, a steering shaft rotatably mounted in said housing, a steering wheel fixed to said shaft and having a recess in its hub, aligned apertures formed in said housing and said shaft, a key projecting through said apertures and preventing relative rotation between said shaft and said housing, and combination lock means mounted in said recess and having a portion engaging said key to prevent its retraction from said apertures, said means comprising a base including a bore, a headed bolt mounted therein for axial movement in said housing, an annular flange fixed to said bolt, a detent mounted in said base and projecting into said bore to prevent retraction of said bolt by engaging said flange, and a slot formed in said flange to permit its retraction past said detent, said detent being resiliently mounted to permit passage of said flange during movement into said bore.

References Cited in the file of this patent

UNITED STATES PATENTS

| Number | Name | Date |
| --- | --- | --- |
| 567,900 | Houghton | Sept. 15, 1896 |
| 1,336,384 | Smith | Apr. 6, 1920 |
| 1,545,712 | Toy | July 14, 1925 |
| 2,441,864 | Baver | May 18, 1948 |
| 2,544,590 | Dyson | Mar. 6, 1951 |